US012761437B2

(12) United States Patent
Ahamed et al.

(10) Patent No.: US 12,761,437 B2
(45) Date of Patent: Oct. 13, 2026

(54) UNIVERSAL OPTICAL WAVEGUIDE TRAYS

(71) Applicant: Applied Materials, Inc., Santa Clara, CA (US)

(72) Inventors: Yaseer Arafath Ahamed, Roundrock, TX (US); Sudhakar Koppa Hanumanthe Gowda, Bangalore (IN); Charles T. Carlson, Leander, TX (US); Kangkang Wang, Fremont, CA (US); Neal Ricks, San Jose, CA (US); Anandhakannan Shanmugavel, Puducherry (IN)

(73) Assignee: Applied Materials, Inc., Santa Clara, CA (US)

( * ) Notice: Subject to any disclaimer, the term of this patent is extended or adjusted under 35 U.S.C. 154(b) by 290 days.

(21) Appl. No.: 18/411,294

(22) Filed: Jan. 12, 2024

(65) Prior Publication Data

US 2025/0231362 A1 Jul. 17, 2025

(51) Int. Cl.
*G02B 6/44* (2006.01)

(52) U.S. Cl.
CPC .................................. *G02B 6/4452* (2013.01)

(58) Field of Classification Search
CPC .................................................... G02B 6/4452
USPC .......................................................... 385/135
See application file for complete search history.

(56) References Cited

U.S. PATENT DOCUMENTS 1,964,499 A * 6/1934 Brasseur ................ B41N 1/248 271/155
4,026,540 A * 5/1977 Lawrence .............. B65H 39/11 271/287
4,815,919 A * 3/1989 Juravic .................. B65G 15/42 414/403
5,660,024 A * 8/1997 Ivanov .................... B65B 63/04 53/118
5,661,954 A * 9/1997 Ivanov .................... B65B 35/26 53/118

(Continued)

FOREIGN PATENT DOCUMENTS

AU 6217396 A * 3/1997 ............. B65B 19/34
ES 2377368 T3 * 3/2012 ............... B42B 5/12

(Continued)

OTHER PUBLICATIONS

International Search Report and Written Opinion mailed May 1, 2025 in corresponding PCT application No. PCT/US2025/010446.

*Primary Examiner* — Kaveh C Kianni

(74) *Attorney, Agent, or Firm* — Nields, Lemack & Frame, LLC

(57) ABSTRACT

A tray for carrying workpieces, such as optical waveguides, is disclosed. The tray includes a plurality of openings, each opening having a plurality of fingers extending toward the center of the opening. The top surface of each finger is sloped downward and comprises an elastomer. In this way, the workpieces contact the fingers along their edges and any nanostructures disposed on the workpiece are not contacted. Further, in some embodiments, the tray is stackable and includes a retention mechanism located on the bottom side of the tray. The retention mechanism on a first tray serves to secure the workpiece disposed on a second tray positioned directly below the first tray. The tray may optionally be used for shipping and other purposes.

16 Claims, 9 Drawing Sheets

(56) References Cited

U.S. PATENT DOCUMENTS

| | | | | | |
|---|---|---|---|---|---|
| 6,085,898 | A * | 7/2000 | Ovadia | A47F 7/02 | 206/480 |
| 6,375,408 | B1 | 4/2002 | Carter | | |
| 6,533,472 | B1 * | 3/2003 | Dinh | G02B 6/4447 | 385/95 |
| 2007/0047895 | A1 * | 3/2007 | Parikh | H02G 15/013 | 385/134 |
| 2007/0051660 | A1 | 3/2007 | Lee et al. | | |
| 2008/0205028 | A1 * | 8/2008 | Papakos | G06F 1/20 | 361/826 |
| 2013/0126375 | A1 * | 5/2013 | Stahl | B65D 1/243 | 206/427 |
| 2019/0064463 | A1 * | 2/2019 | Bandy | G02B 6/4455 | |

FOREIGN PATENT DOCUMENTS

| | | | | |
|---|---|---|---|---|
| GB | 2575529 | A * | 1/2020 | A01G 9/0295 |
| JP | H06171168 | A * | 6/1994 | F26B 25/004 |
| JP | 2009-188057 | A | 8/2009 | |
| JP | 2016-628 | A | 1/2016 | |
| KR | 10-1511599 | B1 | 4/2015 | |

* cited by examiner

UNIVERSAL OPTICAL WAVEGUIDE TRAYS

FIELD

Embodiments of the present disclosure relate to trays and more specifically, a universal tray to carry optical waveguides.

BACKGROUND

In many workpiece processing systems, the workpieces are transported in a carrier or tray. For many applications, the workpiece size and shape is standardized. Thus, one type of tray is able to accommodate all of these workpieces.

However, there is currently a trend to create optical waveguides. These optical waveguides are typically fabricated on a glass substrate. Optical waveguides have sensitive embedded optical nanostructures on the front and back surfaces that cannot be touched. The size and shape of the final substrate is non-standard. For example, some optical waveguides are manufactured for large frames, while other optical waveguides are made for smaller frame sizes. Thus, a back-end line dedicated to the manufacturing of optical waveguides has to be capable of handling several types of form factors without contaminating the nanostructures.

Consequently, manufacturers design unique trays for each type of optical waveguide. These trays may have the JEDEC standard size, which may be roughly 330 mm by 160 mm. but include differently sized and shaped pockets to hold each optical waveguide without touching any of the nanostructures. In some embodiments, there may be 8 pockets disposed on each tray, which are arranged as two rows of four pockets, where the pockets are roughly 60 mm by 40 mm.

This creates a significant burden for production as a wide range of trays and fixtures are stocked to accommodate the different formats.

Therefore, it would be beneficial if there was a universal tray that could be used to accommodate optical waveguides of different sizes and shapes. Further, it would be advantageous if this tray could also be stacked and optionally also be used for shipping.

SUMMARY

A tray for carrying workpieces, such as optical waveguides, is disclosed. The tray includes a plurality of openings, each opening having a plurality of fingers extending toward the center of the opening. The top surface of each finger is sloped downward and comprises an elastomer. In this way, the workpieces contact the fingers along their edges and any nanostructures disposed on the workpiece are not contacted. Further, in some embodiments, the tray is stackable and includes a retention mechanism located on the bottom side of the tray. The retention mechanism on a first tray serves to secure the workpiece disposed on a second tray positioned directly below the first tray. The tray may optionally be used for shipping and other purposes.

According to one embodiment, a universal tray for holding a plurality of workpieces is disclosed. The universal tray comprises a frame comprising a plurality of openings; a plurality of fingers surrounding each of the plurality of openings, the plurality of fingers extending toward a center of a respective opening; and wherein an elastomer is disposed on a top surface of each of the plurality of fingers and wherein a top surface of the elastomer is sloped downward as it extends toward the center of the respective opening. In some embodiments, the plurality of fingers are an integral part of the frame such that the plurality of fingers extend from the frame. In some embodiments, hollow inserts are disposed around the plurality of openings, and the plurality of fingers extend from the hollow inserts. In some embodiments, the elastomer comprises an elastomer layer molded onto the top surface of the plurality of fingers, wherein the elastomer layer is tapered such that the elastomer layer is thicker at a proximal end near the frame than at a distal end of each finger. In some embodiments, a downward support extends downward from the frame to engage with a top surface of a frame of an adjacent tray. In certain embodiments, retention mechanisms are disposed in a volume between the plurality of fingers and a bottom of the downward support to retain a workpiece disposed on an adjacent frame. In certain embodiments, the retention mechanisms comprise a plurality of flexures extending inward toward the center of the respective opening from the downward support. In certain embodiments, the retention mechanisms comprise elastomer disposed on a bottom surface of each of the plurality of fingers. In certain embodiments, the elastomer comprises an elastomer layer molded onto the bottom surface of the plurality of fingers, wherein the elastomer layer is tapered such that the elastomer layer is thicker at a proximal end near the frame than at a distal end of each finger. In certain embodiments, the retention mechanisms are aligned with the plurality of fingers.

According to another embodiment, a kit for use with optical waveguides is disclosed. The kit comprises a universal tray; and a flip tray, comprising a frame with openings; a plurality of fingers extending into the openings; and an elastomer disposed on a bottom surface of each of the plurality of fingers, wherein each finger includes an upwardly sloped region; wherein the flip tray is operable to mount to a top surface of the universal tray to form an assembly, wherein the assembly is configured to be flipped such that an optical waveguide previously disposed on the universal tray is now disposed on the upwardly sloped region of each finger of the flip tray. In some embodiments, the universal tray comprises a frame comprising a plurality of openings; and a plurality of fingers surrounding each of the plurality of openings, the plurality of fingers extending toward a center of a respective opening; wherein a top surface of each finger is sloped downward as it extends toward the center of the respective opening; and wherein the plurality of openings in the flip tray are aligned with the plurality of openings in the universal tray.

According to another embodiment, a universal tray for holding a plurality of workpieces is disclosed. The universal tray comprises a frame comprising a plurality of openings; a plurality of elastomer fingers surrounding each of the plurality of openings, each elastomer finger extending toward a center of a respective opening; and wherein a top surface of each elastomer finger is sloped downward as it extends toward the center of the respective opening. In some embodiments, each elastomer finger is thicker at a proximal end near the frame than at a distal end of the elastomer finger. In some embodiments, the frame comprises smaller holes disposed around each of the plurality of openings, and wherein a bottom of each elastomer finger comprises one or more plugs that are operable to be inserted into the smaller holes to hold each elastomer finger in place. In some embodiments, a downward support extends downward from the frame to engage with a top surface of a frame of an adjacent tray and retention mechanisms are disposed in a volume between the plurality of elastomer fingers and a bottom of the downward support to retain a workpiece disposed on an adjacent frame. In certain embodiments, the retention mechanisms comprise a tapered bottom surface of each elastomer finger.

BRIEF DESCRIPTION OF THE FIGURES

For a better understanding of the present disclosure, reference is made to the accompanying drawings, which are incorporated herein by reference and in which.

DETAILED DESCRIPTION

As described above, in certain systems, it is desirable to have a tray that can accommodate a plurality of differently sized optical waveguides.

Figure 1A:
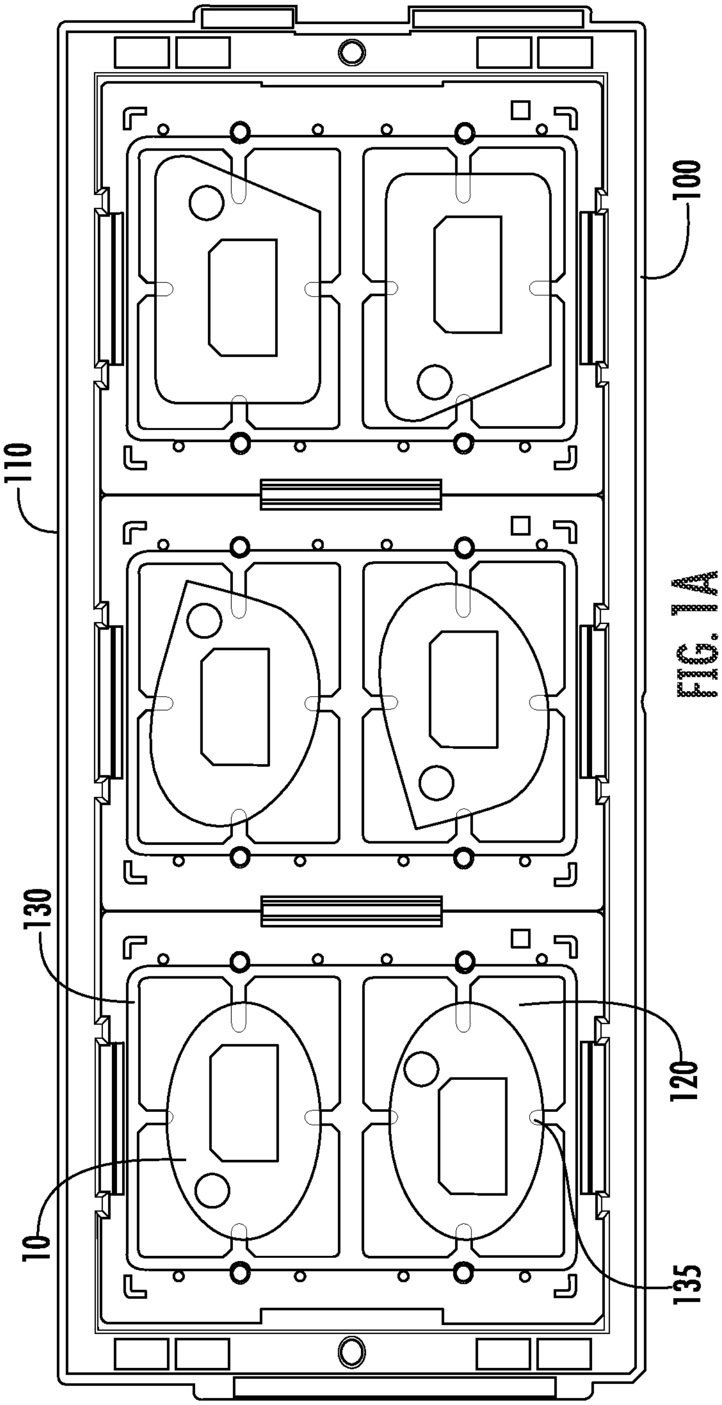
FIG. 1A is a top view of the universal tray according to one embodiment.

FIG. 1A shows a universal tray according to one embodiment. The universal tray 100 includes a frame 110, which may have a standard size, which may be a JEDEC standard size, such as 330 mm by 160 mm. The frame 110 may be made from a polymer, such as modified polyphenylene oxide (MPPO). The frame 110 may include a plurality of openings.

In certain embodiments, the plurality of openings in the frame 110 are each sized to accommodate exactly one optical waveguide 10. In this embodiment, hollow inserts 130, also made from a polymer, may be disposed around each of the plurality of openings. The hollow inserts 130 may be shaped as hollow rectangles. Each hollow insert 130 may be dimensioned so as to create openings 120 having a size of roughly 60 mm by 40 mm. Of course, the openings 120 may have different dimensions.

In another embodiment, the frame 110 may include larger openings. In this embodiment, the hollow inserts 130 may fit into a larger opening and include additional structures that divide the larger opening into two or more openings 120 that each accommodate one optical waveguide 10. In both embodiments, the hollow inserts 130 each comprise a plurality of fingers 135 that extend toward the center of a respective opening 120. In some embodiments, there may be four fingers 135 associated with each opening 120, each located roughly at the center of each of the four sides of the respective opening 120. In another embodiment, there may be four fingers 135 each located at a corner of the respective opening 120 and extending toward the center. In another embodiment, there may be three fingers. In other embodiments, there may be more than four fingers 135.

In other embodiments, a hollow insert may not be used. Rather, the frame 110 is created with a plurality of openings 120. In this embodiment, the fingers 135 may be part of the frame 110 and extend into the openings 120.

The fingers 135 may be rectangular prisms, having a length between 8 mm and 25 mm, a width between 2.5 mm and 5 mm, and a thickness between 0.5 mm and 4 mm. In some embodiments, the fingers 135 may all have the same dimensions. In other embodiments, one or more of the fingers 135 may have a different size than the other fingers 135.

Figure 1B:
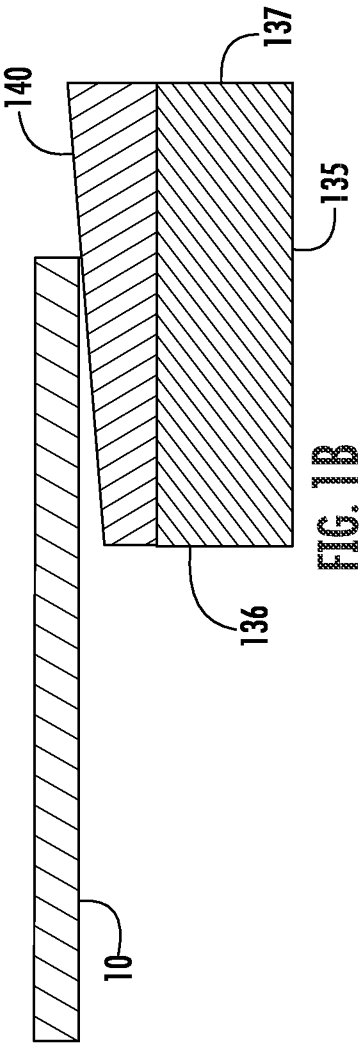
FIG. 1B is a side view of the universal tray of FIG. 1A showing the fingers supporting the optical waveguide.

FIG. 1B shows a side view of an optical waveguide 10 disposed on a finger 135. Disposed on the top surface of each finger 135 is an elastomer layer 140. The elastomer layer 140 may be any suitable material, such as styrene, isoprene, isobutylene or others. The elastomer may be selected such that it possesses a high coefficient of friction to minimize lateral movement of the optical waveguide 10. Additionally, it is desirable that the elastomer also possesses a low pull off force. For example, in certain embodiments, the pull off force for a typical optical waveguide (less than 50 g) may be 100 gf or less, while the elastomer has sufficient tack or retention to resist movement when subjected to more than 1 G acceleration in the lateral directions. In certain embodiments, the elastomer layer 140 is molded onto the hollow inserts 130 (if used) and specifically, on the fingers 135. The thickness of the elastomer layer 140 may be between 0.5 mm and 4 mm. In certain embodiments, the thickness of the elastomer layer 140 may be uneven. Specifically, the elastomer layer 140 may be tapered so as to be thinner at the distal ends 136 of the fingers 135 than at the proximal ends 137 near the frame 110. In one specific example, the top surface of the elastomer layer 140 may have a slope that is between 1° and 10° or less. Thus, depending on the length of the finger 135, the thickness of the elastomer layer 140 at the distal end of the finger 135 may be roughly 2 mm thinner than at the proximal end.

In another embodiment, the fingers 135 may be sloped and the elastomer layer 140 may have a constant thickness. In both embodiments, a resulting top surface, which is the elastomer, is sloped.

Because the elastomer layer 140 is sloped, the entirety of the finger 135 is not in contact with the optical waveguide 10. Rather, only a small portion of the edge of the optical waveguide 10 is actually resting on the elastomer layer 140. In this way, the risk of contacting one of the nanostructures on the back surface of the substrate is reduced. Further, the optical waveguide 10 is held in place by frictional force of the elastomer and/or by the interatomic bonds between the optical waveguide 10 and the elastomer layer 140.

While FIGS. 1A-1B show a universal tray 100 created using a elastomer layer 140, other embodiments are also possible.

Figure 2A:
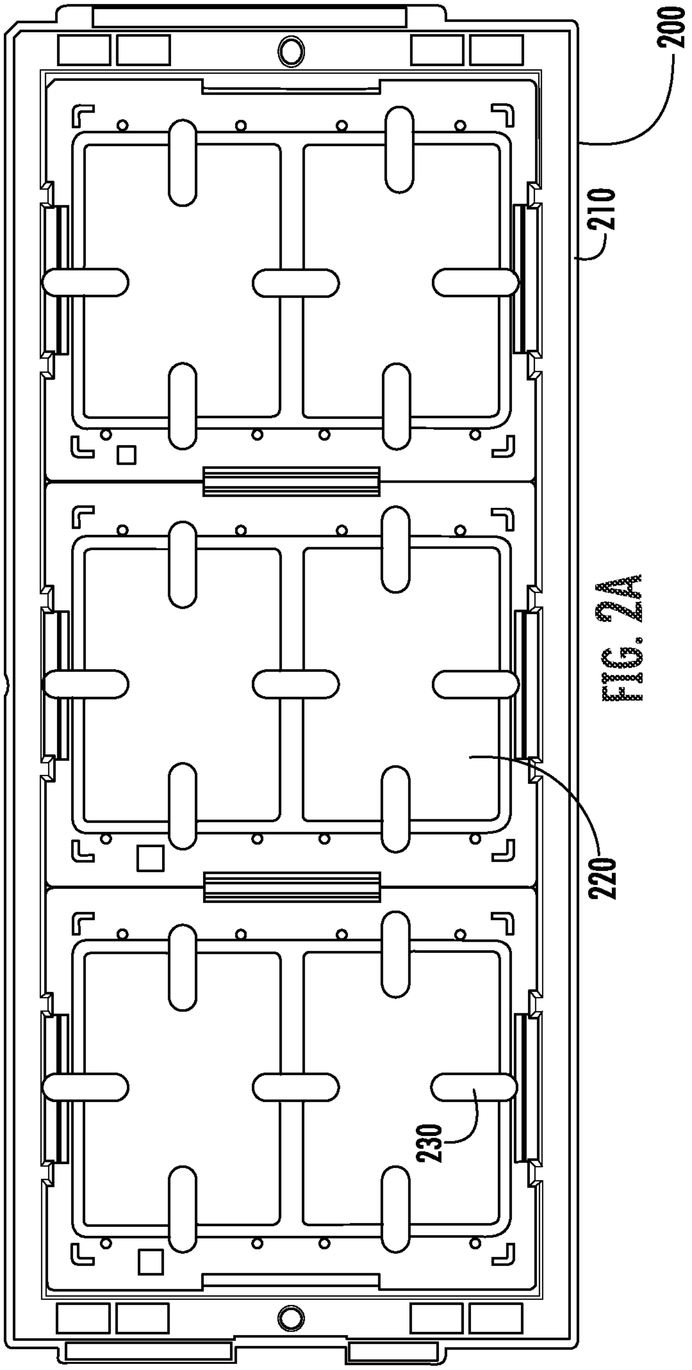
FIG. 2A is a top view of the universal tray according to a second embodiment.

For example, FIG. 2A shows a universal tray 200 according to another embodiment. In this embodiment, the universal tray 200 includes a frame 210. The frame 210 may be a standard size, such as 330 mm by 160 mm. The frame 210 may be made from a polymer, such as MPPO. The frame 210 may include a plurality of openings 220. Each opening 220 may have dimensions of 60 mm by 40 mm, although other sizes are also possible. A plurality of smaller holes (not shown) may be disposed around each opening 220. The smaller holes may be located along the sides of each opening 220. In another embodiment, the smaller holes may be disposed at the corners of each opening 220.

Figure 2B:
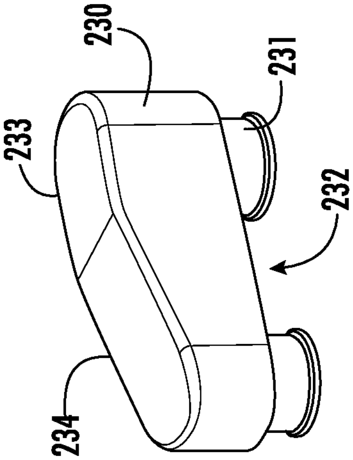
FIG. 2B shows the insertable components used with the universal tray of FIG. 2A.

Elastomer fingers 230, best seen in FIG. 2B, are used in this embodiment. The elastomer fingers 230 may be made from any of the elastomers described above. Further, the elastomer finger 230 has one or more plugs 231 located on the bottom surface 232 that may be pressed into the smaller holes in the frame 210. The elastomer fingers 230 also have a top surface 233 that includes a sloped portion 234. This sloped portion 234 may have a slope that is between 1° and 10° or less.

In other words, the elastomer finger 230 is held in place by pressing the plug 231 into one or more of the smaller holes on the frame 210. The sloped portion 234 extends toward the center of the opening 220. The optical waveguide 10 then rests on the sloped portion 234.

Note that in both embodiments, the universal tray includes a frame that may be a standard size, which includes a plurality of openings. Surrounding each opening, there is a plurality of fingers, which extend toward the center of the respective opening. Further, in both embodiments, the fingers are sloped in the region that contacts the optical waveguide 10. Further, there is an elastomer on the surface of the fingers that contacts the optical waveguide 10 in both embodiments. Thus, in both embodiments, the optical waveguide 10 is contacted by the elastomer only near its edges, as the sloped fingers minimize contact with other parts of the waveguide. Further, because there is minimal contact between the fingers and the optical waveguide 10, the trays described herein may also be used for inspection.

Note that the trays shown in FIGS. 1A-1B and 2A do not retain the workpieces in the upward direction. In other words, the fingers support the optical waveguide 10 in the downward direction. Further, the adhesive quality of the elastomer holds the optical waveguide 10 in place in the lateral directions. However, since the pull off force is low, the optical waveguide 10 may be able to disengage in the upward direction.

Figure 3A:
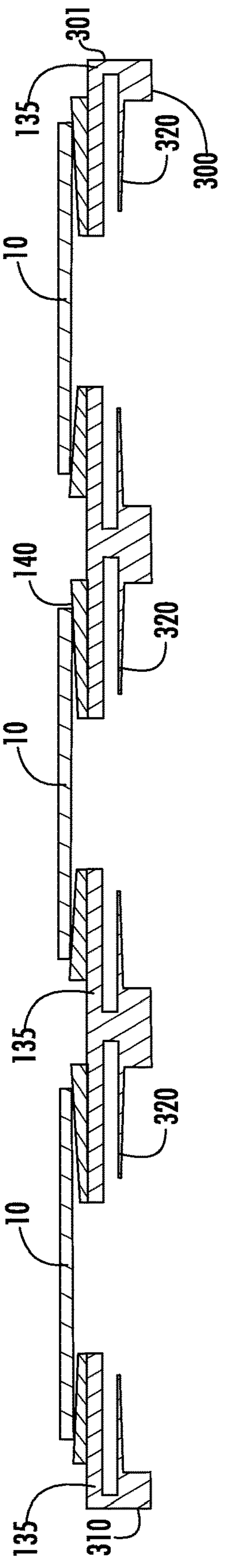
FIG. 3A shows a stackable tray according to one embodiment.
Figure 3B:
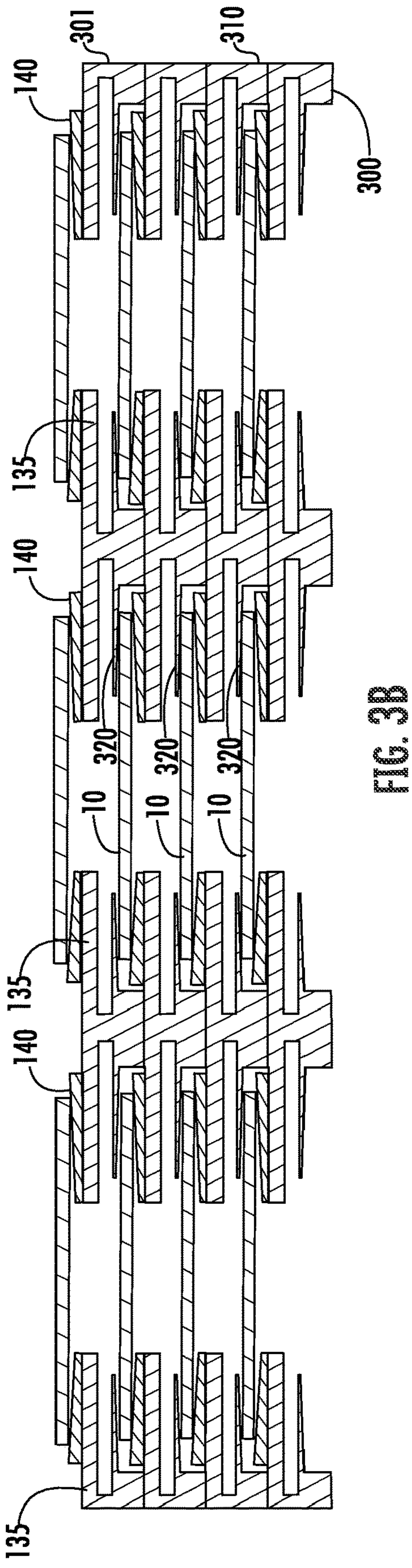
FIG. 3B shows a plurality of the stackable trays of FIG. 3A.
Figure 3C:
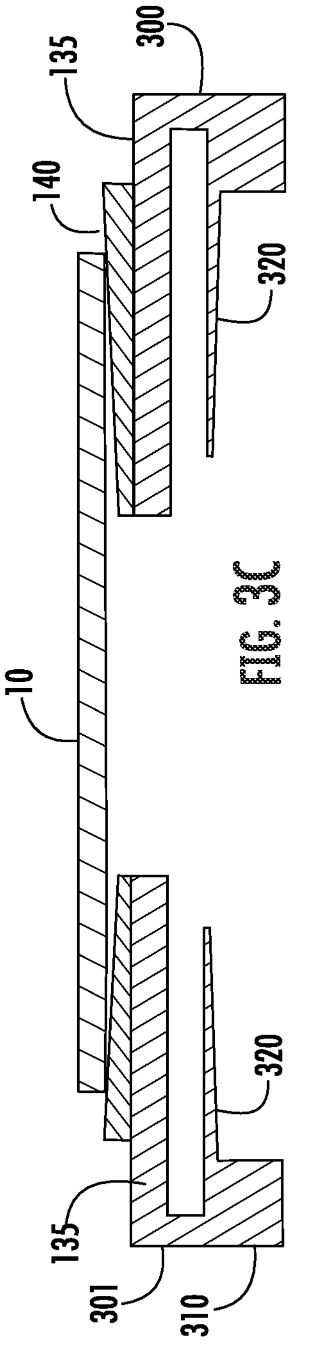
FIG. 3C shows an enlarged view of a portion of the stackable tray shown in FIG. 3A.
Figure 3D:
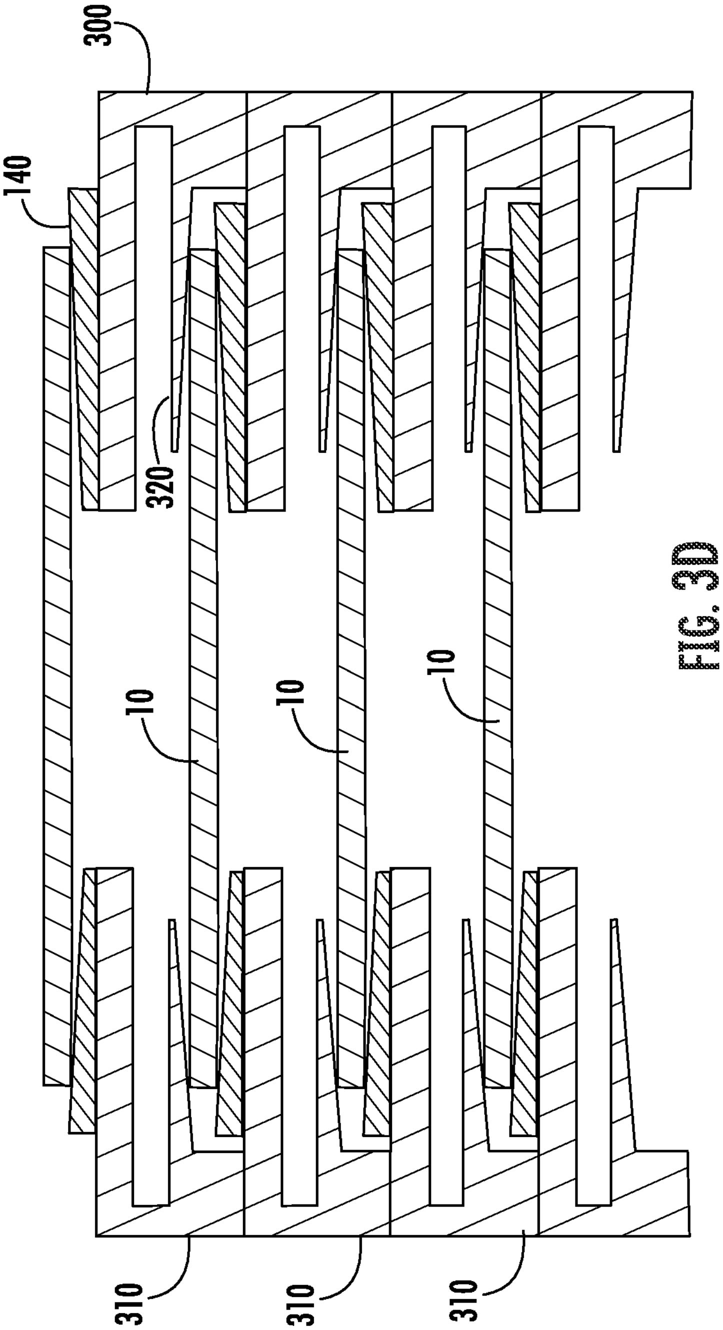
FIG. 3D shows an enlarged portion of the plurality of the stackable trays shown in FIG. 3B.

Thus, in some embodiments, the trays described above include retention mechanisms, such that the trays are stackable and retain the optical waveguides 10 in position. FIG. 3A shows a side view of a stackable tray 300 that includes retention mechanisms. This stackable tray 300 has the same number and arrangement of openings as that shown in FIG. 1A. FIG. 3B shows a side view of a plurality of stackable trays 300 stacked on top of each other. FIG. 3C shows an enlarged view of the stackable tray 300 of FIG. 3A. FIG. 3D shows an enlarged view of the plurality of stackable trays 300 shown in FIG. 3B. Note that the configuration of the fingers on the stackable tray 300 may be either of the implementations shown in FIGS. 1A and 2A. In other words, while FIGS. 3A-3D and FIGS. 4A-4B show a stackable tray 300 that includes fingers 135 with a sloped elastomer layer 140, the retention mechanisms described in FIGS. 3A-3D and 4A-4B may also be incorporated into the frame 210 shown in FIG. 2A.

FIG. 3A shows the stackable tray 300, while FIG. 3C shows an enlarged view of a portion of the stackable tray 300. Specifically, FIG. 3C shows the retention mechanism associated with one opening. For the frame 110 shown in FIG. 1A, there would be three such sets of retention mechanisms disposed along the longer dimension (as shown in FIG. 3C) and two disposed along the shorter dimension.

As explained above and best seen in FIG. 3C, the stackable tray 300 includes a frame 301 having openings that are surrounded by fingers 135, each having an elastomer layer 140. Further, the stackable tray 300 includes downward supports 310 that serve to provide the separation between the top of the adjacent stackable tray 300 and the bottom of the optical waveguide 10, as shown in FIG. 3D. These downward supports 310 may serve as legs that support the stackable frame 300. The downward supports 310 may be disposed only along the shorter edges of the stackable tray 300 or may be disposed along both sets of edges. Further, there may be engagement mechanisms on the bottom of the downward supports 310 that mate with corresponding engagement mechanisms on the top surface of the stackable tray 300. For example, there may be small protrusions on the bottom of the downward supports 310 that fit in depressions located in the top surface of the adjacent stackable tray 300. Alternatively, there may be protrusions on the top surface of the frame 301 of the stackable tray 300 and depressions on the bottom of the downward supports 310. In this way, the stackable trays 300 may removably lock together.

The retention mechanisms 320 are disposed in the volume between the finger 135 and the bottom of the downward support 310 and extend outward toward the center of the opening. The retention mechanism 320 may be sloped upward at an angle that may be between 1° and 10°. In this way, similar to the fingers, the retention mechanism 320 only contacts the top surface of the optical waveguide 10 at its outer edge. Thus, when a stackable tray 300 is placed on top of a second stackable tray 300, as shown in FIGS. 3B and 3D, the fingers 135 of the lower stackable tray 300 support the optical waveguide 10 from the bottom, while the retention mechanism 320 of the upper stackable tray 300 serve to hold the optical waveguide 10 from the top.

Figure 4A:
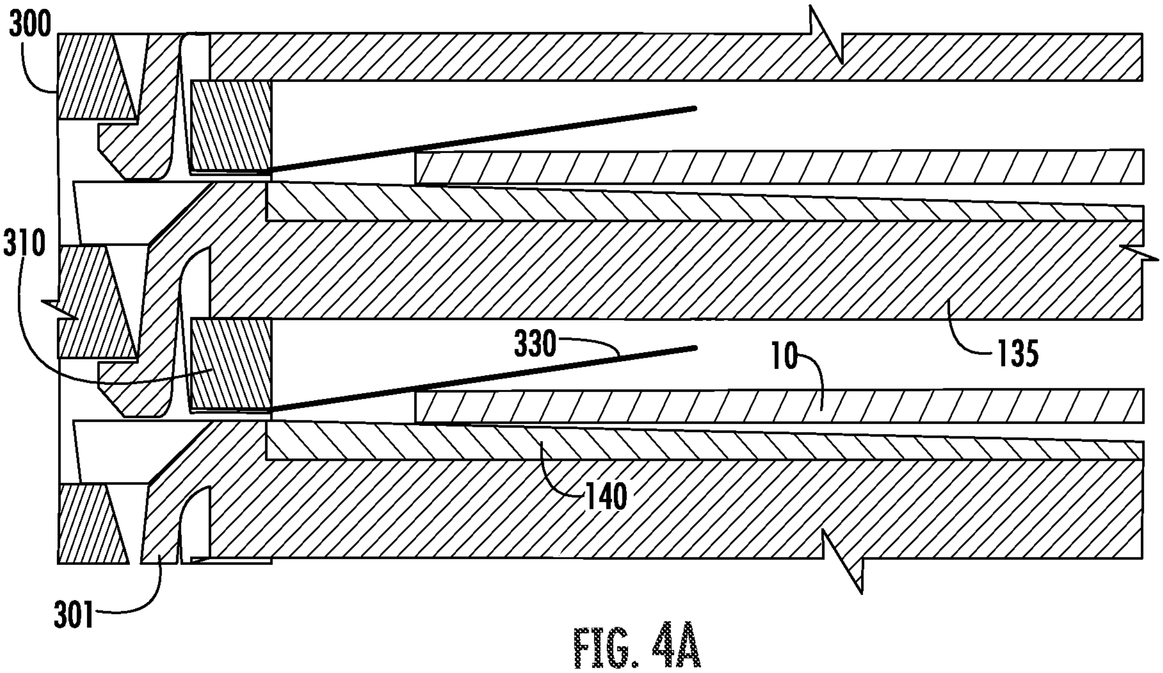
FIGS. 4A-4B show two embodiments that may be utilized to create the mechanism used for stacking.

This retention mechanism may be formed in a number of ways. FIG. 4A shows an enlarged view of a first embodiment of a retention mechanism 320, which is a flexure 330. In this embodiment, the optical waveguide 10 is supported by the elastomer layer 140 disposed on a finger 135 of a first stackable tray 300. A second stackable tray 300 that is located above the first stackable tray 300 includes a flexure 330 extending from the downward support 310. The flexure 330 may be a thin member. In some embodiments, the flexure 330 may be tapered or angled slightly upward. In one embodiment, the flexure 330 may be an integral part of the frame 301 of the stackable tray 300. In another embodiment, the flexure 330 may be attached to the frame 301 of the stackable tray 300 after molding. The thinness of the flexure 330 allows it to be compliant, moving when it contacts the top surface of the optical waveguide 10.

Figure 4B:
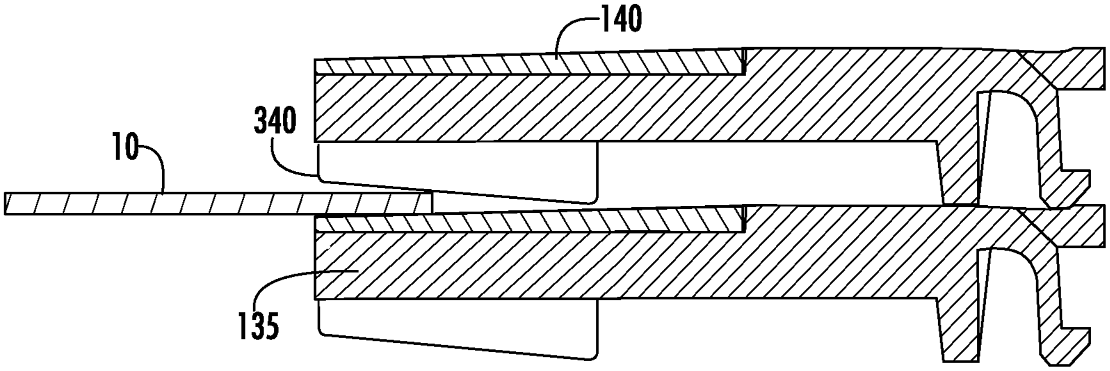

FIG. 4B shows an enlarged view of a second embodiment of a retention mechanism 320, which comprises a second elastomer layer 340. In this embodiment, a second elastomer layer 340 is disposed on the bottom surface of the finger 135. The second elastomer layer 340 has a thickness that allows it to contact the optical waveguide 10 disposed on the finger in the adjacent stackable tray 300. The second elastomer layer 340, like the elastomer layer 140, may be sloped, such as at an angle of between 1° and 10°. Thus, the second elastomer layer 340 is thinner at the distal end of the finger 135 than at the proximal end. Note that this mechanism may be used with the embodiment shown in FIGS. 2A-2B by molding the elastomer finger 230 to have sloped portions on both opposite surfaces.

The use of the retention mechanism 320 allows the optical waveguide 10 to be held in place in the vertical direction and inhibits movement during transfer and shipping. Further, the sloped nature of the retention mechanism 320 ensures that the optical waveguides 10 are only contacted along the edges, minimizing potential damage and contamination.

Figure 5:
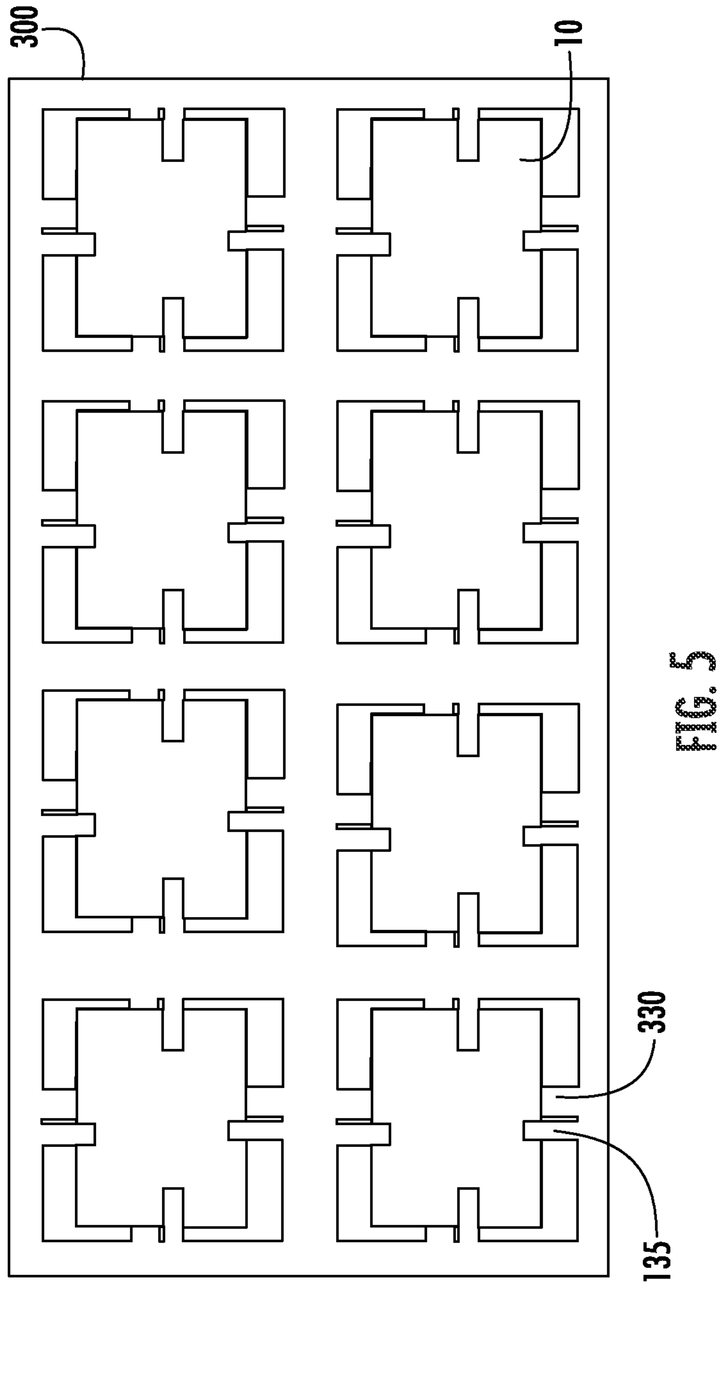
FIG. 5 shows the top view of a stackable tray.

In the embodiment shown in FIG. 4B, the retention mechanism 320 and the fingers 135 are aligned in the vertical direction, such that the retention mechanism 320 is disposed directly beneath the finger 135. In certain embodiments, the retention mechanism shown in FIG. 4A may be similarly configured, such that the flexures 330 are disposed directly beneath the fingers 135. However, in another embodiment, shown in FIG. 5, the flexures 330 are offset from the fingers 135.

Figure 6A:
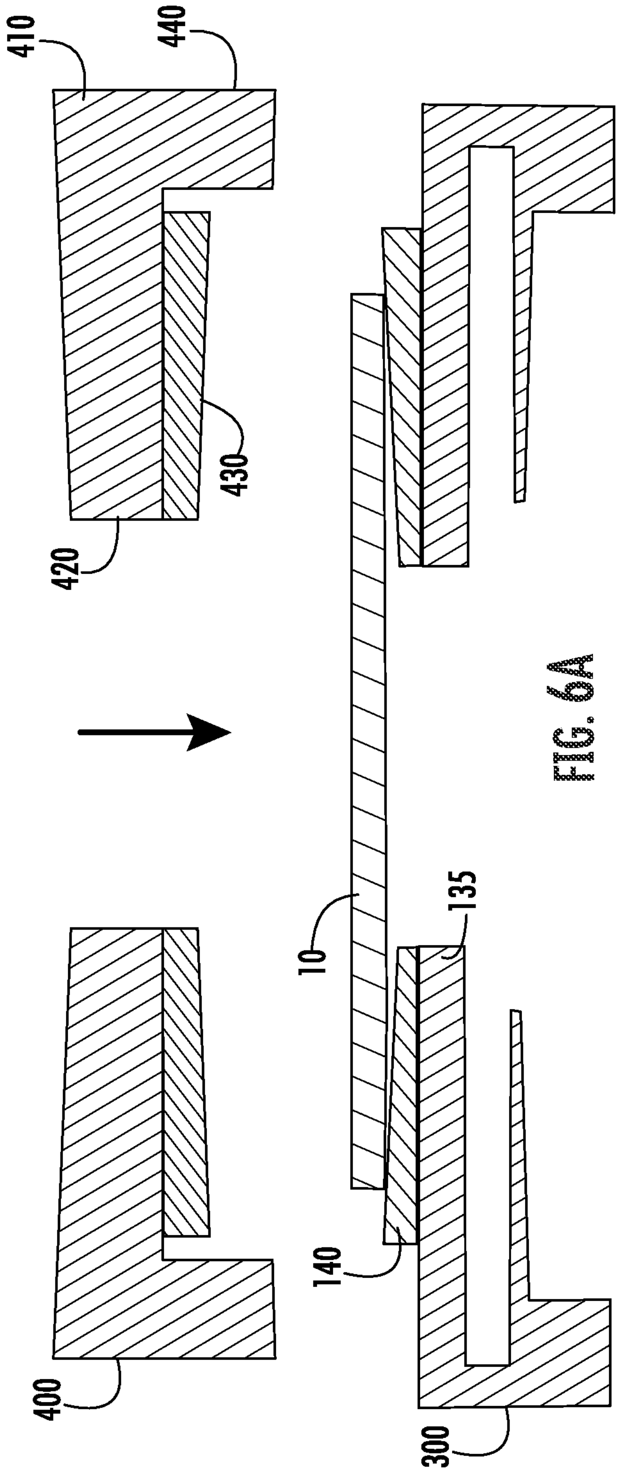
FIGS. 6A-6D shows the sequence to flip an optical waveguide using a flip tray.
Figure 6B:
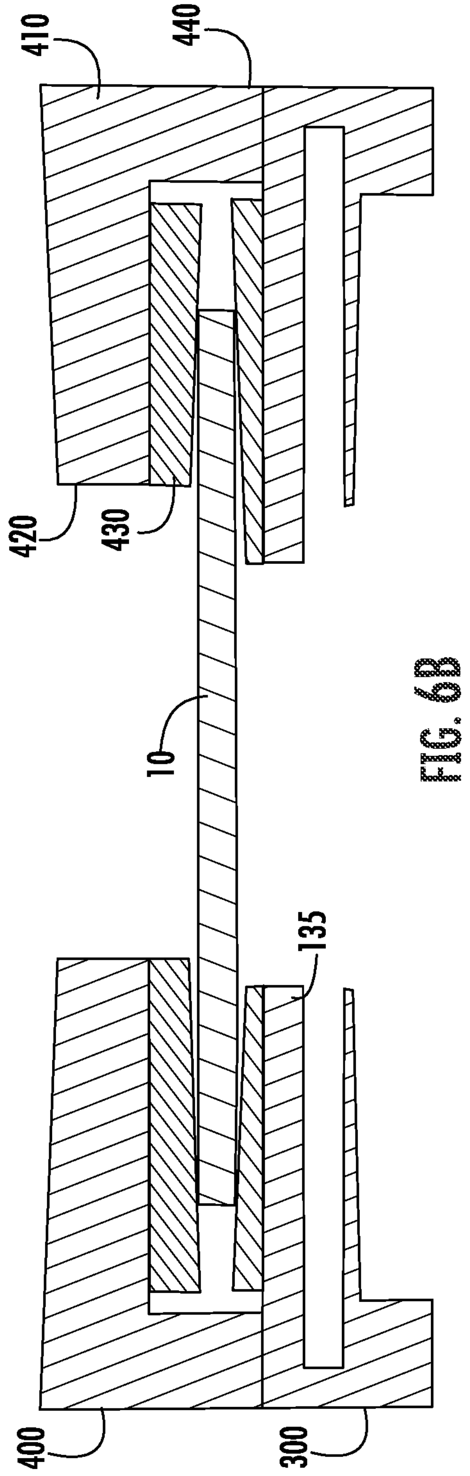

Because the optical waveguides 10 are not secured in the upward direction, the frames described herein may also be utilized to flip the optical waveguide 10. FIGS. 6A-6D show the sequence that may be used to flip the optical waveguide 10. In this embodiment, a second type of tray is created, referred to as a flip tray 400. As shown in FIG. 6A, the flip tray 400 has a frame 410, like the trays described earlier. In addition, the flip tray 400 has a plurality of openings with fingers 420 extending into each of the openings, similar to those described above with respect to FIG. 1A or FIG. 2A. Finally, a bottom side elastomer layer 430 may be disposed on the bottom surface of the fingers 420. This bottom side elastomer layer 430 contains an upwardly sloped region, which may have an angle of between 1° and 10°. Thus, the finger 420 is thicker at the proximal end near the frame than at the distal end. In other embodiments, the entire finger 420 may be an elastomer, similar to the configuration in FIG. 2A. The flip tray 400 includes downward supports 440, which may engage with the top surface of the frame 301 of the stackable tray 300. As described above, the engagement mechanisms may include protrusions and corresponding depressions. The openings in the flip tray 400 and the stackable tray 300 are aligned. Further, the downward supports 440 are dimensioned such that the bottom side elastomer layer 430 of the flip tray 400 contacts or nearly contacts the optical waveguide 10 when the flip tray 400 is placed on top of the stackable tray 300, as shown in FIG. 6B.

Figure 6C:
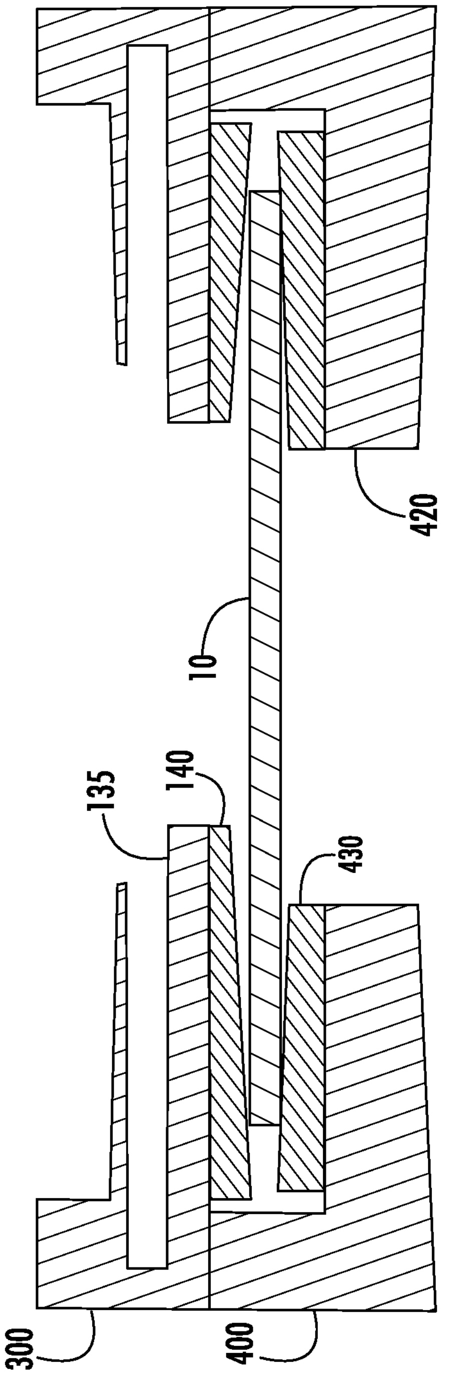
Figure 6D:
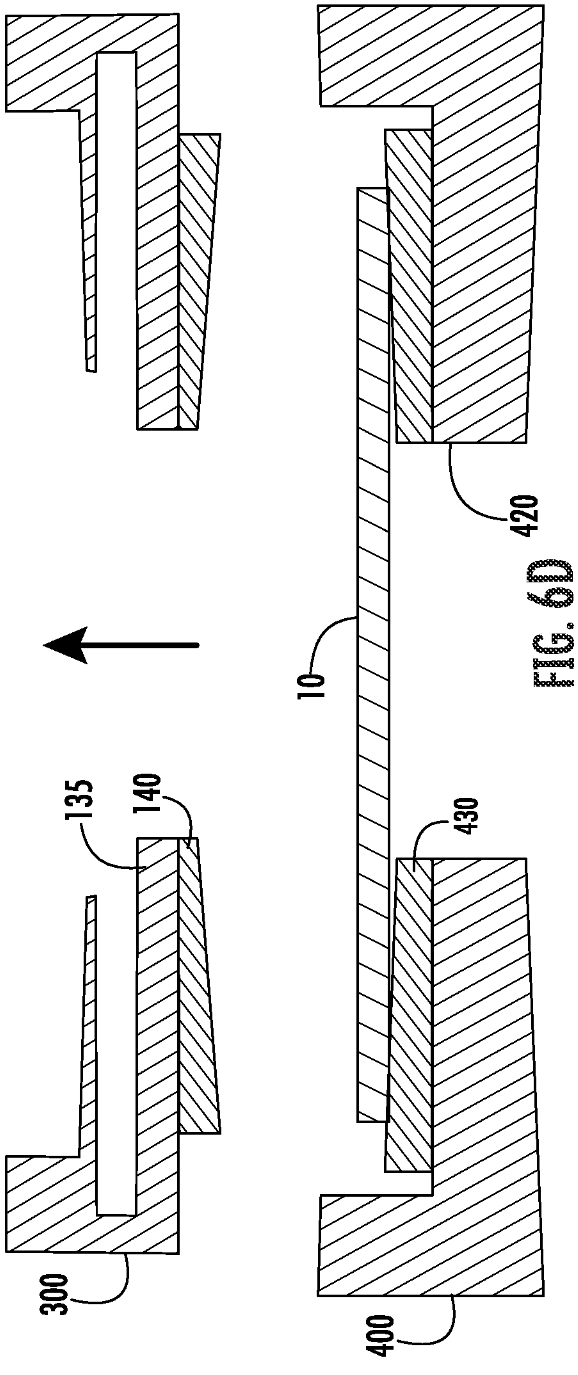

After the flip tray 400 is positioned on top of the stackable tray 300, the assembly is flipped such that the flip tray 400 is now beneath the stackable tray 300, as shown in FIG. 6C. Lastly, the stackable tray 300 is lifted off the flip tray 400, as shown in FIG. 6D. After this, the bottom surface of the optical waveguide 10 is exposed and ready for processing. Note that this sequence is also operable if the tray does not include the retention mechanisms 320.

Thus, the universal tray and the flip tray form a kit that may be used to handle and manipulate optical waveguides.

Figure 7A:
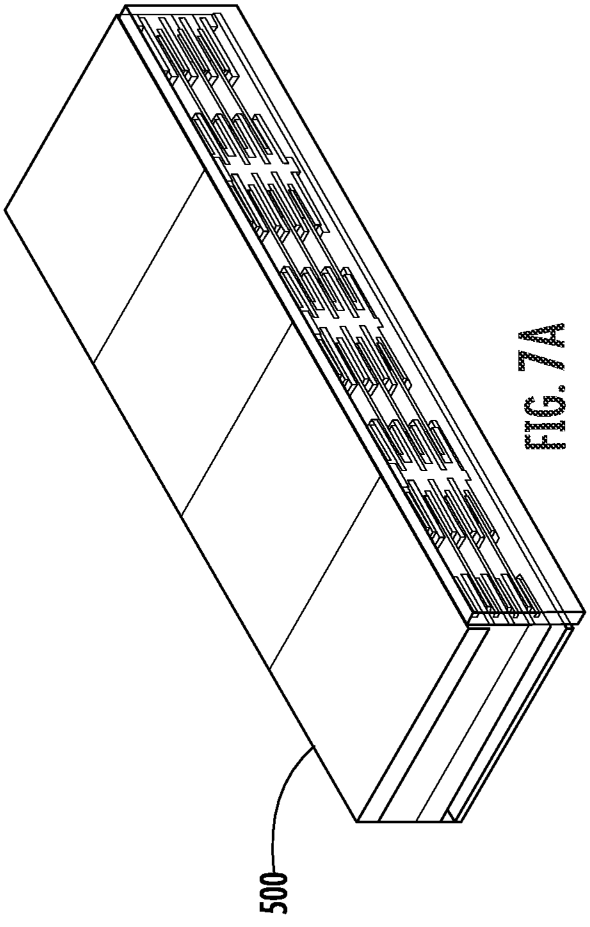
FIGS. 7A-7B show a shipping container that may be utilized with the universal tray described herein.
Figure 7B:
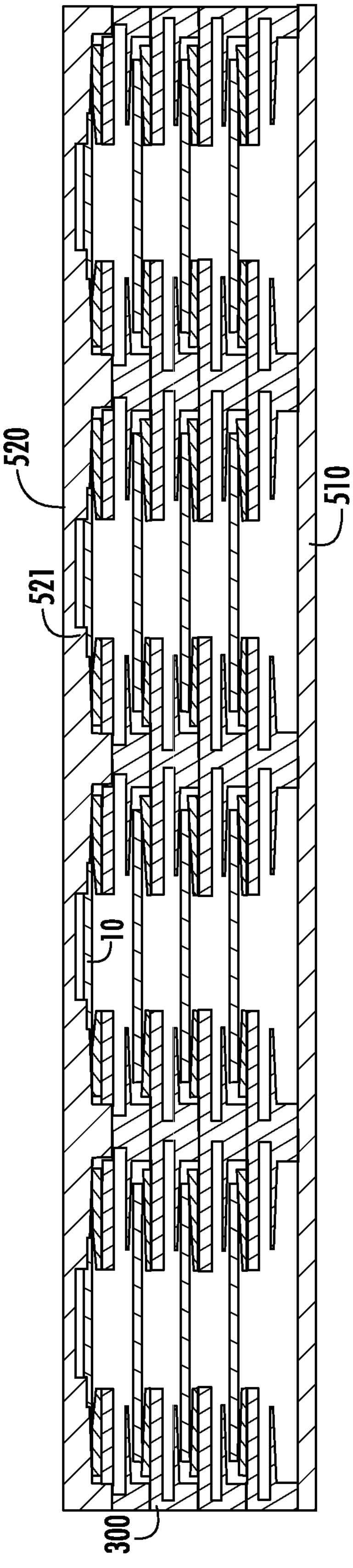

The stackable tray 300 described earlier has other applications as well. Since the optical waveguides 10 are supported on the top surface and the bottom surface, the stackable trays 300 may also be used to transport and ship the optical waveguides 10. FIGS. 7A-7B show a plurality of stackable trays 300 packaged for shipping. FIG. 7A shows an assembly 500 comprising a plurality of stackable trays 300 with top, bottom and side covers, while FIG. 7B shows a cross-sectional view of the assembly 500 of FIG. 7A. While these figures show the stackable tray 300 holding 4 optical waveguides 10 in the long dimension, other embodiments are also possible. In FIG. 7B, a bottom cover 510 is placed beneath the lowest of the plurality of stackable trays 300. Since there is no optical waveguide 10 disposed near the bottom cover 510, this bottom cover 510 may simply be a flat plate, having engagement mechanisms to secure it to the bottom stackable tray 300. In the embodiment shown in FIG. 7B, the top cover 520 includes a top cover elastomer layer 521 located on the bottom surface. The top cover elastomer layer 521 has a sloped portion, similar to that described above, and is dimensioned to contact the edges of the optical waveguides 10 when the top cover 520 is installed. Further, side covers (not shown) may be disposed on the other surfaces of the assembly 500. If side covers are used, the top cover 520 and the bottom cover 510 may be attached to these side covers.

Note that in another embodiment, the top cover 520 may be simplified. By incorporating an additional stackable tray 300 on top of the uppermost frame that holds an optical waveguide 10, the retention mechanism of this additional stackable frame is used to hold the optical waveguide 10 in place. In this embodiment, the top cover 520 is similar to the bottom cover 510, in that it may be a flat plate and contain engagement mechanisms to secure it to this top stackable tray 300.

Note that while the disclosure describes the use of the universal tray with optical waveguides, it is understood that this tray may be used with other types of workpieces and its utility is not limited to optical waveguides.

The system described herein has many advantages. First, by utilizing the downward sloped fingers with an elastomer top surface, the optical waveguides may be held in place without contacting the nanostructures disposed on either surface of the substrate. Further, since there is no contact on the top surface, visual inspection may be performed while the optical waveguides are positioned in the universal tray. Further, this configuration allows the optical waveguide to be flipped, as the pull off force is relatively low. Thus, a special flip tray may be used to allow processing of the bottom surface.

Additionally, the inclusion of a retention mechanism allows the optical waveguides to be held in place in the vertical direction as well. This has many benefits. First, large numbers of trays may be stacked on top of one another for movement through the manufacturing facility. Additionally, optical waveguides may be cleaned while in an assembly of stacked universal trays, as there are multiple openings and slots through which liquid may travel. This facilitates ultra or megasonic cleaning without having to transfer the optical waveguides to a different tray. Additionally, top, bottom and side covers may be used to encapsulate the assembly of stacked universal trays, allowing the assembly to be transported and shipped without moving to a different carrier.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A universal tray for holding a plurality of workpieces, comprising:

a frame comprising a plurality of openings;

a plurality of fingers surrounding and extending into each of the plurality of openings, the plurality of fingers extending toward a center of a respective opening, such that at least three fingers extend into each of the plurality of openings; and wherein an elastomer is disposed on a top surface of each of the plurality of fingers and wherein a top surface of the elastomer is sloped downward as it extends toward the center of the respective opening.

2. The universal tray of claim 1, wherein the plurality of fingers are an integral part of the frame such that the plurality of fingers extend from the frame.

3. The universal tray of claim 1, wherein hollow inserts are disposed around the plurality of openings, and the plurality of fingers extend from the hollow inserts.

4. The universal tray of claim 1, wherein the elastomer comprises an elastomer layer molded onto the top surface of the plurality of fingers, wherein the elastomer layer is tapered such that the elastomer layer is thicker at a proximal end near the frame than at a distal end of each finger.

5. The universal tray of claim 1, further comprising a downward support extending downward from the frame to engage with a top surface of a frame of an adjacent tray.

6. The universal tray of claim 1, wherein the elastomer comprises an elastomer layer molded onto the top surface of the plurality of fingers, wherein the elastomer layer is uniform thickness and the plurality of fingers are sloped such that the top surface of the elastomer layer is sloped downward as it extends toward the center of the respective opening.

7. A universal tray for holding a plurality of workpieces, comprising:

a frame comprising a plurality of openings;

a plurality of fingers surrounding each of the plurality of openings, the plurality of fingers extending toward a center of a respective opening;

a downward support extending downward from the frame to engage with a top surface of a frame of an adjacent tray; and retention mechanisms disposed in a volume between the plurality of fingers and a bottom of the downward support to retain a workpiece disposed on an adjacent frame; wherein an elastomer is disposed on a top surface of each of the plurality of fingers and wherein a top surface of the elastomer is sloped downward as it extends toward the center of the respective opening.

8. The universal tray of claim 7, wherein the retention mechanisms comprise a plurality of flexures extending inward toward the center of the respective opening from the downward support.

9. The universal tray of claim 7, wherein the retention mechanisms comprise elastomer disposed on a bottom surface of each of the plurality of fingers.

10. The universal tray of claim 9, wherein the elastomer comprises an elastomer layer molded onto the bottom surface of the plurality of fingers, wherein the elastomer layer is tapered such that the elastomer layer is thicker at a proximal end near the frame than at a distal end of each finger.

11. The universal tray of claim 7, wherein the retention mechanisms are aligned with the plurality of fingers.

12. A universal tray for holding a plurality of workpieces, comprising:

a frame comprising a plurality of openings;

a plurality of elastomer fingers surrounding and extending into each of the plurality of openings, each elastomer finger extending toward a center of a respective opening, such that at least three elastomer fingers extend into each of the plurality of openings; and wherein a top surface of each elastomer finger is sloped downward as it extends toward the center of the respective opening.

13. The universal tray of claim 12, wherein each elastomer finger is thicker at a proximal end near the frame than at a distal end of the elastomer finger.

14. The universal tray of claim 12, wherein the frame comprises smaller holes disposed around each of the plurality of openings, and wherein a bottom of each elastomer finger comprises one or more plugs that are operable to be inserted into the smaller holes to hold each elastomer finger in place.

15. The universal tray of claim 12, further comprising a downward support extending downward from the frame to engage with a top surface of a frame of an adjacent tray and further comprising retention mechanisms disposed in a volume between the plurality of elastomer fingers and a bottom of the downward support to retain a workpiece disposed on an adjacent frame.

16. The universal tray of claim 15, wherein the retention mechanisms comprising a tapered bottom surface of each elastomer finger.

* * * * *